(12) United States Patent
Ikuta et al.

(10) Patent No.: US 7,097,124 B2
(45) Date of Patent: Aug. 29, 2006

(54) DUAL BEARING REEL

(75) Inventors: Takeshi Ikuta, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/113,002

(22) Filed: Apr. 25, 2005

(65) Prior Publication Data

US 2005/0253006 A1 Nov. 17, 2005

(30) Foreign Application Priority Data

May 11, 2004 (JP) .............................. 2004-141379

(51) Int. Cl.
*A01K 89/01* (2006.01)
(52) U.S. Cl. .................................. 242/322
(58) Field of Classification Search ................ 242/287, 242/290, 301, 302, 303, 304, 322
See application file for complete search history.

(56) References Cited

U.S. PATENT DOCUMENTS

| | | | | |
|---|---|---|---|---|
| 2,628,041 A | * | 2/1953 | Slater | 242/286 |
| 5,318,246 A | * | 6/1994 | Ikuta | 242/303 |
| 5,556,049 A | * | 9/1996 | Bennett et al. | 242/295 |
| 5,560,562 A | * | 10/1996 | Hartmann | 242/255 |
| 6,045,073 A | * | 4/2000 | Ikuta | 242/260 |
| 6,827,306 B1 | * | 12/2004 | Datcuk, Jr. | 242/303 |

FOREIGN PATENT DOCUMENTS

JP 11-009160 A 1/1999

* cited by examiner

*Primary Examiner*—Emmanuel M Marcelo
(74) *Attorney, Agent, or Firm*—Global IP Counselors, LLP

(57) ABSTRACT

A spool has a bobbin, and first and second flange portions that are formed on both ends of the bobbin and have diameters larger than that of the bobbin. A drag mechanism that brakes the spool and includes a drag operation member and first and second member that are arranged on the handle side of the spool. The first brake member is attached to the second flange portion. The second brake member is arranged axially movably and opposite the first brake member. The second flange portion has a large diameter portion and a small diameter portion. The large diameter portion has a diameter larger than that of the first brake member. The small diameter portion is formed between the bobbin and the large diameter portion and has a diameter smaller than that of the first brake member.

12 Claims, 8 Drawing Sheets

DUAL BEARING REEL

BACKGROUND OF THE INVENTION

1. Field of the Invention

The present invention relates to a dual bearing reel. More specifically, the present invention relates to a dual bearing reel that releases and winds fishing line.

2. Background Information

Lever drag type dual bearing reels that move the spool shaft in the axial direction by a lever shaped drag operation member to brake the spool are generally known as dual bearing reels. This dual bearing reel includes a reel unit having a pair of side plates and side covers, a spool shaft that is supported on the reel unit so as to be movable in the axial direction, a spool that is rotatively supported on the spool shaft, a drag mechanism that brakes the spool, and a rotation transmission mechanism that serves to rotate the spool by rotating a handle.

The spool is movable in the axial direction together with the spool shaft, and has a bobbin for winding fishing line around the outer periphery thereof, and flange portions arranged on both ends of the bobbin which project radially outward. The drag mechanism includes a first brake member arranged on an outer side surface of one flange portion of the spool, a second brake member that can be pressed into contact with the first brake member, and a spool shaft movement mechanism that moves the spool shaft in the axial direction. The second brake member is rotatively supported on the spool shaft, and the rotation from the handle is transmitted to the second brake member via the rotation transmission mechanism. The spool shaft movement mechanism has a lever shaped drag operation member that is pivotably supported on the reel unit, a cap shaped drag adjustment member that is fixedly coupled to one end of the spool shaft, and a cam member that is disposed between the drag operation member and the drag adjustment member and is non-rotatably mounted on the reel unit. Slant cams are formed on the cam member, and by pivoting the drag operation member, the drag operation member will raise the slant cams, and the cam member will press the drag adjustment member to move the spool shaft in one axial direction. Movement to the other axial direction of the spool shaft is effected by the urging force of a spring member that is disposed, for example, between the first brake member and the second brake member.

With this type of dual bearing reel, the drive force due to the rotation of the handle is transmitted to the first brake member of the drag mechanism via the rotation transmission mechanism, and transmitted to the spool by pressing the first brake member and second brake member into contact with each other. With this type of configuration, adjustment of the drag mechanism braking force is carried out by pivoting the drag operation member mounted on one end of the spool shaft. When the drag operation member is pivoted in one direction, the spool shaft will move in one of the axial directions due to the cam member, the spool will come near the drag mechanism, and the first brake member will be pressed into contact with the second brake member. With this type of dual bearing reel, by operating the drag operation member, the drag mechanism braking force will be adjusted, and the first brake member and the second brake member will separate from each other and place the spool in the free rotation state.

A dual bearing reel having this type of drag function is known, in which the diameter of a flange portion to which the first brake member is fixedly attached is larger than that of the flange member on the opposite side, and the diameter of the first brake member is larger than the flange portion on the opposite side (see, for example, Japanese Patent Application Publication No. H11-9160). With this dual bearing reel, because the first brake member is formed to have a diameter that is larger than the flange portion on the opposite side, the torque applied to the first brake member will become larger. Accordingly, the braking force of the drag can increase.

Because a dual bearing reel having the aforementioned conventional drag mechanism is formed such that the first brake member has a diameter that is larger than that of the flange portion on the opposite side, the braking force of the drag can be increased. However, when the flange portion to which the first brake member is attached, in order to form the first brake member with a large diameter, is formed to have a diameter larger than that of the flange portion on the opposite side, fishing line may be wound onto the bobbin up to a position on the flange portion to which the first brake member is attached that reaches beyond the flange portion on the opposite side. When a large amount of fishing line is wound onto the bobbin on the flange portion side to which the first brake member is attached in this way, the wind up torque applied to the spool may increase, and the smooth rotation of the spool during wind-up may be compromised.

In view of the above, it will be apparent to those skilled in the art from this disclosure that there exists a need for an improved dual bearing reel that overcomes the problems of the conventional art. This invention addresses this need in the art as well as other needs, which will become apparent to those skilled in the art from this disclosure.

SUMMARY OF THE INVENTION

It is an object of the present invention to improve the braking capacity of the drag mechanism while maintaining the smooth rotation of the spool of a lever drag type of dual bearing reel during the wind-up operation.

A dual bearing reel according to the first aspect of the present invention is a dual bearing reel that will release and wind fishing line, and includes a handle, a reel unit, a spool, and a drag mechanism. The handle is mounted on the reel unit. The spool is rotatably disposed within the reel unit. The spool has a tubular bobbin portion around the outer periphery of which fishing line is adapted to be wound, and first and second flange portions that are arranged on both ends of the bobbin portion to project radially outward. The drag mechanism has a drag operation member that is pivotably mounted on the reel unit, a first brake member that is attached to the second flange portion, and a second brake member that is arranged axially movably and at least partially opposite the first brake member. The second flange portion has a large diameter portion and a small diameter portion. The large diameter portion has a diameter that is larger than that of the first brake member. The small diameter portion is formed between the bobbin portion and the large diameter portion and has a diameter that is smaller than that of the first brake member. By operation of the drag operation member, the first brake member will contact with and separate from the second brake member, the friction created by the contact between the first brake member and the second brake member will change, and thereby the braking force to be applied on the spool changes.

With this dual bearing reel, the first brake member is attached to the axial outer side of the second flange portion, and the second flange portion is formed so as to have a diameter that is larger than that of the first flange portion. In addition, the second flange portion is formed with the small diameter portion having a diameter that is smaller than that of the first brake member, and the large diameter portion having a diameter that is larger than that of the first brake member. Here, because the large diameter portion of the second flange portion is formed so as to have a diameter larger than that of the small diameter portion, the first brake member can be formed to have a large diameter, and the braking force of the drag can be increased. In addition, because the small diameter portion of the second flange portion is formed to have a diameter that is smaller than that of the large diameter portion, the step portion of the small diameter portion will serve as an upper limit guide up to which the fishing line can be wound. Thus, the amount of fishing line to be wound can be reduced, and the torque applied to the spool during the wind-up operation can be reduced. Thus, braking capacity of the drag mechanism can be improved, while the smoothness of the rotation of the spool can be maintained during the wind-up operation.

A dual bearing reel according to the second aspect of the present invention is the dual bearing reel of the first aspect of the present invention, in which the diameter of the small diameter portion is substantially the same as that of the first flange portion. Here, by forming the first flange portion and the small diameter portion of the second flange portion to have approximately the same diameter, fishing line can be wound uniformly from left to right.

A dual bearing reel according to the third aspect of the present invention is the dual bearing reel of the first or second aspect of the present invention, in which the large diameter portion is unitarily formed with the small diameter portion. Here, by unitarily forming the large diameter portion with the small diameter portion, the number of parts can be reduced, and strength can be maintained at a high level.

A dual bearing reel according to the fourth aspect of the present invention is the dual bearing reel of the first or second aspect of the present invention, in which the large diameter portion is formed separately from the small diameter portion. Here, it will be easy to manufacture a large diameter portion that is separate from the small diameter portion.

A dual bearing reel according to the fifth aspect of the present invention is the dual bearing reel of the fourth aspect of the present invention, in which the second flange portion further includes a third flange portion that is unitarily formed with the large diameter portion and extends toward the inner periphery of the large diameter portion, and a fourth flange portion that is formed on the inner peripheral side of the small diameter portion, unitarily with the small diameter portion opposite the third flange portion. The third flange portion together with the first brake member is attached to the fourth flange portion with a screw. Here, the number of screw members required can be reduced compared to the case where the third flange portion and the first brake member are separately screwed to the fourth flange portion.

A dual bearing reel according to the sixth aspect of the present invention is the dual bearing reel of any of the first through fifth aspects of the present invention, in which the reel unit has a first side plate and a second side plate that are disposed opposite one another across a predetermined gap, connectors that connect the first side plate and the second side plate, a first side cover that covers the exterior of the first side plate, and a second side cover on which the handle is mounted and which covers the exterior of the second side plate. The spool is disposed between the first and second side plates. The second side plate is disposed so as to cover a stepped surface formed between the large diameter portion and the small diameter portion. Here, because the second side plate covers the large diameter portion and the small diameter portion, fishing line can be prevented from winding on the outer periphery of the second side plate beyond the small diameter portion.

A dual bearing reel according to the seventh aspect of the present invention is the dual bearing reel of the sixth aspect of the present invention, in which the second side plate extends radially inward so as to be adjacent to the small diameter portion. Here, because the second side plate extends inward in the radial direction so as to be adjacent to the small diameter portion, the tip of the second side plate can limit the movement of fishing line axially outward on the second side plate.

A dual bearing reel according to the eighth aspect of the present invention is the dual bearing reel of the sixth or seventh aspect of the present invention, in which a portion of the second side plate that covers the stepped surface between the large diameter portion and the small diameter portion is slanted. The small diameter portion side is smaller in diameter than the large diameter side. The reel unit further includes a connector that connects the first and second side plates. The connector is smoothly connected with the second side plate. Here, the entire reel can be made smaller by eliminating the portion of the second side plate that projects outwards and making the portion slanted toward the inner peripheral side and connecting the portion with the connector that is disposed within the outer contour of the reel.

A dual bearing reel according to the ninth aspect of the present invention is the dual bearing reel of any of the first through eighth aspects of the present invention, in which the bobbin portion and the first and second flange portions are formed as one-piece unitary member.

A dual bearing reel according to the tenth aspect of the present invention is the dual bearing reel of any of the first through ninth aspects of the present invention, in which the first brake member is attached to the second flange portion with a screw.

A dual bearing reel according to the eleventh aspect of the present invention is the dual bearing reel of any of the first through tenth aspects of the present invention, in which the diameter of the large diameter portion is equal to and greater than 110% and equal to and less than 140% of the diameter of the small diameter portion.

A dual bearing reel according to the twelfth aspect of the present invention is the dual bearing reel of the eleventh aspect of the present invention, in which the diameter of the large diameter portion is equal to and greater than 120% and equal to and less than 130% of the diameter of the small diameter portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
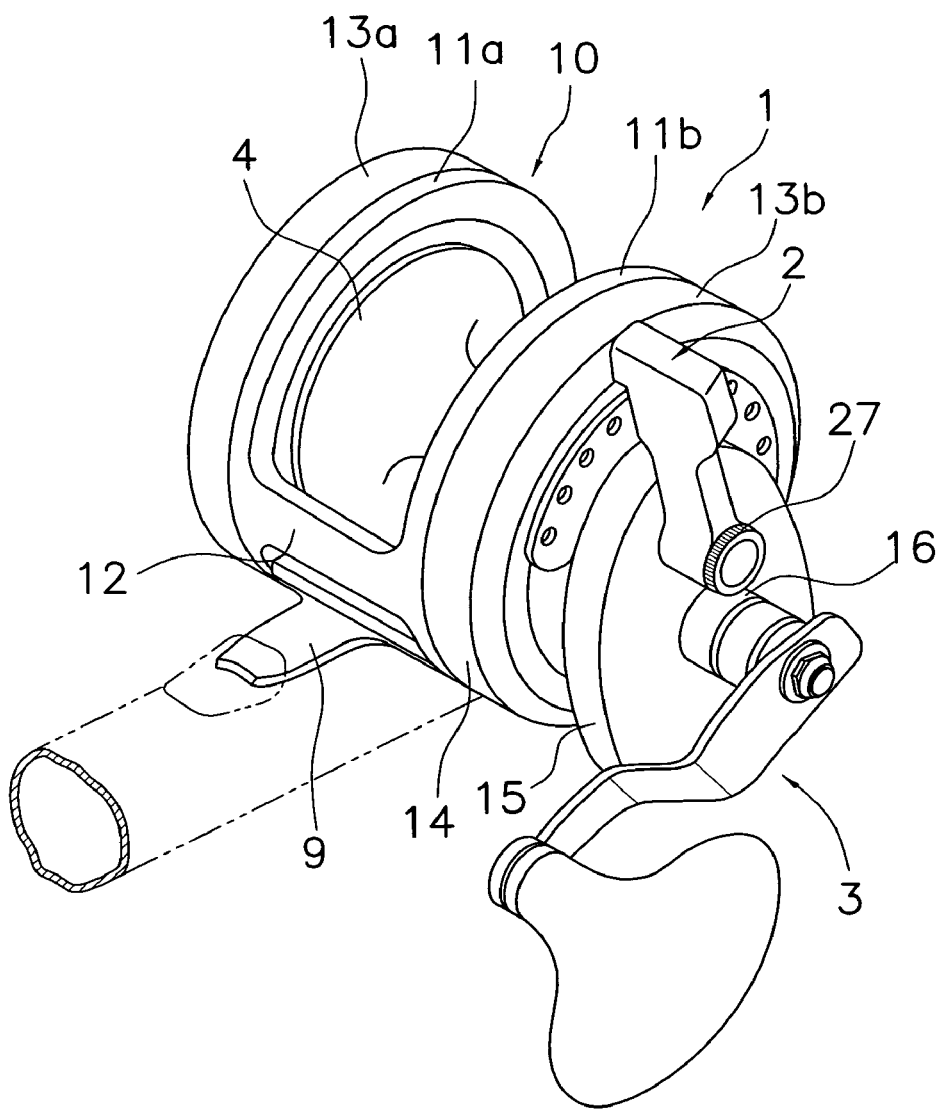
FIG. 1 is an oblique view of a dual bearing reel according to a first embodiment of the present invention.
Figure 2:
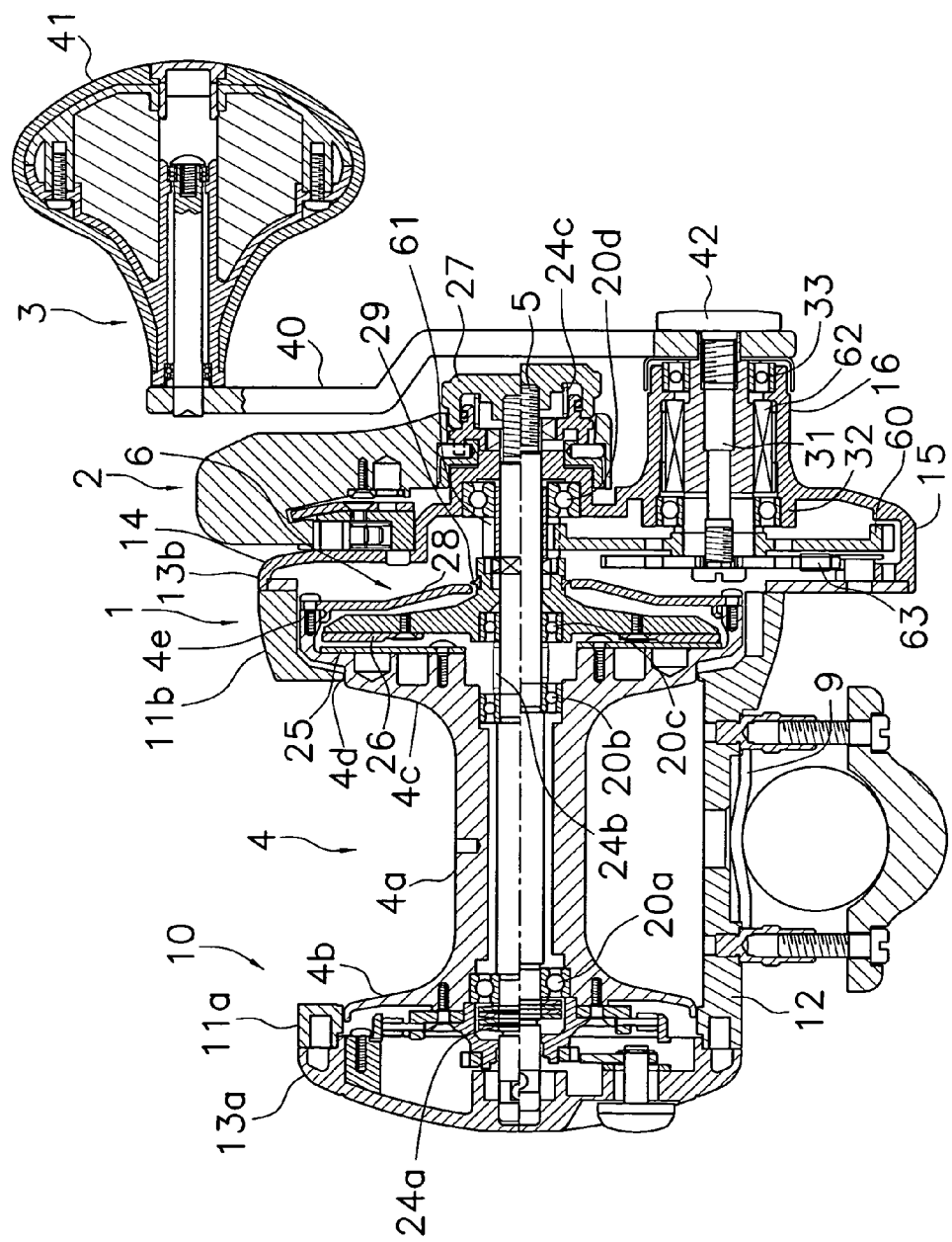
FIG. 2 is a cross-sectional view of the dual bearing reel according to the first embodiment of the present invention.

As shown in FIG. 1 and FIG. 2, a dual bearing reel according to one embodiment of the present invention is a mid-sized lever drag type, and includes a reel unit 1, a drag operation member 2 pivotably disposed on a side of the reel unit 1, a handle 3 rotatively supported on the reel unit 1 below the drag operation member 2, and a spool 4 disposed in the interior of the reel unit 1.

The reel unit 1 has a frame 10, and a first side cover 13a and a second side cover 13b that cover both sides of the frame 10. The frame 10 has a first side plate 11a and a second side plate 11b that are paired right to left, and a plurality of connectors 12 that connect the first side plate 11a and second side plate 11b. The first side plate 11a and the second side plate 11b are approximately circular in shape when viewed laterally, and the diameter of the second side plate 11b is formed to be larger than the diameter of the first side plate 11a. For example, the diameter of the second side plate 11b is in a range between 110% and 140% of the diameter of the first side plate 11a, and in this embodiment, is between 110% and 120% of the diameter of the first side plate 11a. The plurality of connectors 12 are unitarily formed with the first side plate 11a and the second side plate 11b, and as shown in FIG. 1 and FIG. 2, a rod mounting leg 9 made of metal that extends from front to rear is fixedly attached to the lower connectors 12 to mount the reel to the fishing rod.

As shown in FIG. 1 and FIG. 2, the first side cover 13a is approximately circular in shape when viewed laterally and is mounted on one side of the first side plate 11a. The second side cover 13b has a tubular portion 14 that is mounted on one side of the second side plate 11b, and a bulging portion 15b that extends axially outward (the right side of FIG. 2) of the tubular portion 14. The first side cover 13a and the second side cover 13b are approximately circular in shape when viewed laterally and have approximately the same respective diameter as the first side plate 11a and the second side plate 11b, and the diameter of the second side cover 13b is formed to be larger than the diameter of the first side cover 13a. For example, the diameter of the second side cover 13b is in a range between 110% and 140% of the diameter of the first side cover 13a, and in this embodiment, is between 110% and 120% of the diameter of the first side cover 13a.

As shown in FIG. 1 and FIG. 2, the tubular portion 14 is a tubular member that is approximately circular in shape when viewed laterally and is mounted on one side of the second side plate 11b. The bulging portion 15 is unitarily formed with the tubular portion 14, and is formed to project axially outward (the right side of FIG. 2) so that there is a space in the interior that communicates with the inside of the tubular portion 14. The bulging portion 15 is an approximately oval shaped member when viewed laterally, and is formed so that the approximately semi-circular shaped portion on the lower portion thereof projects downward from the tubular portion 14. The drag operation member 2 and the handle 3 are mounted on the bulging portion 15 so that they are outwardly exposed.

As shown in FIG. 1 and FIG. 2, a projecting tube 16 for mounting the handle 3 is formed below the drag operation member 2 of the bulging portion 15 and projects outward. As shown in FIG. 2, a handle shaft 31 is disposed in the interior of the projecting tube 16 in parallel with the spool shaft 5 (the rotation shaft of the spool 4). As shown in FIG. 2, the handle shaft 31 is rotatively supported on the projecting tube 16 by two bearings 32, 33 that are disposed on both ends of the projecting tube 16. A roller type first one way clutch 62 is disposed between the bearings 32, 33. The first one way clutch 62 permits rotation only in the line winding direction of the handle shaft 31. In addition, a ratchet type second one way clutch 63 is also disposed on the base end of the handle shaft 31. The second one way clutch 63 also permits rotation only in the line winding direction of the handle shaft 31.

As shown in FIG. 2, the handle 3 is fixedly coupled to the tip of the handle shaft 31. The handle 3 includes a handle arm 40 that is fixedly coupled to the tip of the handle shaft 31, and a handle knob 41 that is rotatively supported on the tip of the handle arm 40. The handle arm 40 is non-rotatably coupled to the handle shaft 31 with a screw member 42. The handle knob 41 serves to make it easy to grip and input force, and is formed into an approximate T-shape having a rounded exterior shape.

As shown in FIG. 2, the spool 4 has a tube-shaped bobbin 4a, and a first flange portion 4b and a second flange portion 4c formed on both ends of the bobbin 4a such that the diameters of the first and second flange portions 4a and 4b are larger than that of the bobbin 4a. The spool 4 is rotatably supported on the spool shaft 5 by bearings 20a, 20b. In addition, a drag mechanism 6 that brakes the spool 4 is arranged on the handle 3 side of the spool 4.

As shown in FIG. 2, the second flange portion 4c is formed so that the diameter thereof is larger than the diameter of the first flange portion 4b. As shown in enlarged form in FIG. 5, the second flange portion 4c has tubular small diameter portion 4d that is formed so that the bobbin 4a side has a diameter smaller than that of a first brake member 25 (described below) that is part of the drag mechanism 6, and a tubular large diameter portion 4e that is formed so that its outermost periphery has a larger diameter than that of the first brake member 25. The small diameter portion 4d is unitarily formed with the large diameter portion 4e so as to have a diameter smaller than that of the large diameter portion 4e, and is arranged so as to define a step portion between the large diameter portion 4e and the end of the bobbin 4a. Here, when fishing line will be wound around the outer periphery of the bobbin 4a, but the fishing line can be wound only up to the outermost diameter of the small diameter portion 4d due to the step portion of the small diameter 4d. In addition, the second side plate 11b is disposed so as to cover a stepped surface 4e1 formed between the large diameter portion 4e and the small diameter portion 4d, and the tip portion of the second side plate 11b extends inward in the radial direction so as to be adjacent to the small diameter portion 4d. Because of this, fishing line can be prevented from being wound on the outer periphery of the small diameter portion 4d, and fishing line can be restricted from moving outward in the axial direction.

As shown in FIG. 2, the diameter of the small diameter portion 4d is formed to be approximately the same as the diameter of the first flange portion 4b. The diameter of the large diameter portion 4e is in the range of 110% to 140% of the diameter of the small diameter portion 4d, and in this embodiment, is between 120% and 130% of the diameter of the small diameter portion 4d. In addition, the diameter of the large diameter portion 4e is formed to be approximately the same as the diameter of the first side plate 11a and the first side cover 13a. In addition, the diameter of the first brake member 25 is in the range of 90% or greater of the diameter of the small diameter portion 4d, and in this embodiment, is between 130% and 140% of the diameter of the small diameter portion 4d. In addition, the outer diameter of the bobbin 4a is 30% to 40% of the diameter of the small diameter portion 4d.

Figure 3:
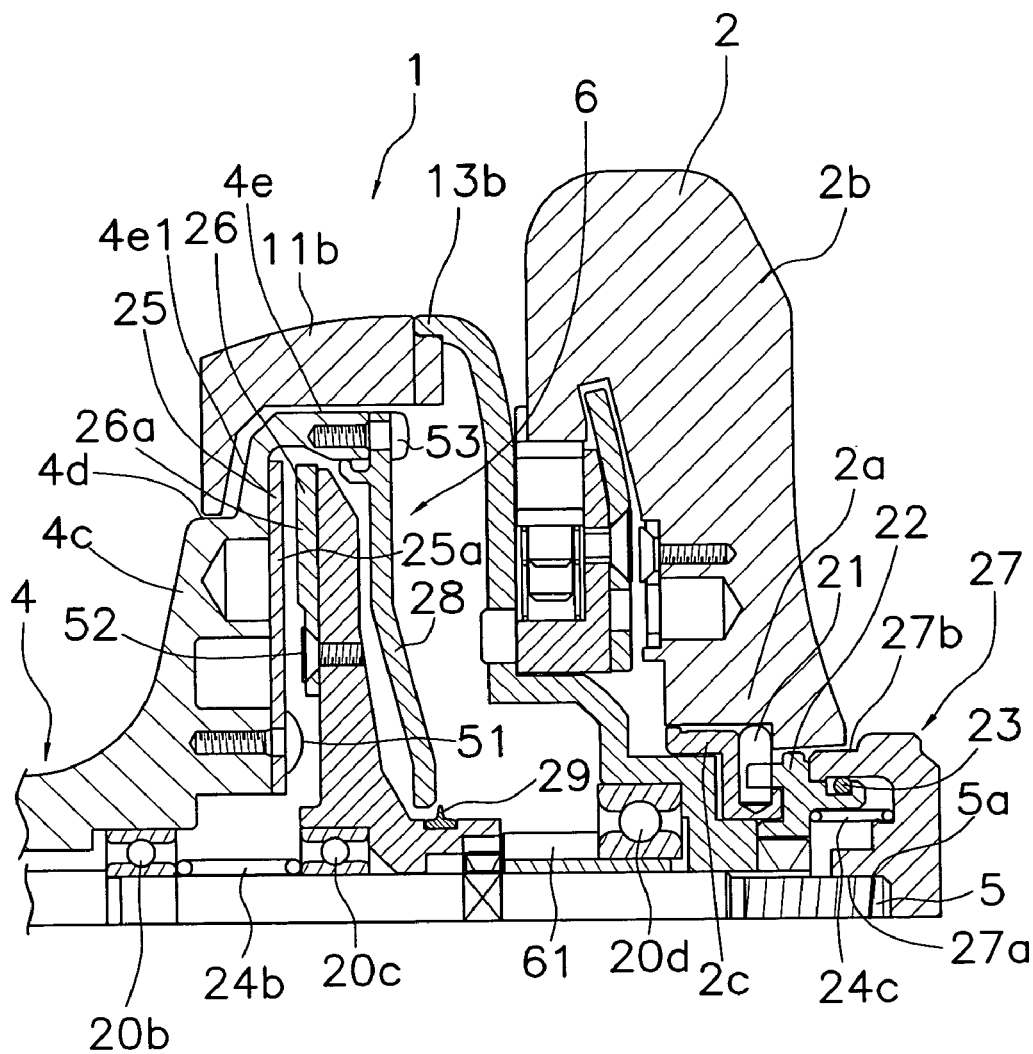
FIG. 3 is an enlarged cross-sectional view of a drag mechanism according to the first embodiment of the present invention.

As shown in FIG. 2, the drag mechanism 6 serves to change and adjust the braking force applied to the rotation in the line winding direction of the spool 4 mounted on the spool shaft 5. As shown in FIG. 3, the drag mechanism 6 has the drag operation member 2, a first cam member 21 that is arranged on the inner peripheral portion of the drag operation member 2, a second cam member 22 that is disposed to be in contact with the first cam member 21, a drag adjustment member 27 that is relatively rotatably mounted on the second cam member 22 and pulls the spool shaft 5 outward (the right side in FIG. 2), a retaining member 23 that retains the drag adjustment member 27 in the axial direction with respect to the second cam member 22, a first urging member 24a (see FIG. 2) and a second urging member 24b that urge the spool 4 inward in the axial direction, a third urging member 24c that urges the drag adjustment member 27 outward in the axial direction (right side of FIG. 2), a first brake member 25 that is attached on an axially outward (the right side of FIG. 2) surface of the spool 4, and a second brake member 26 disposed to be contactable with the first brake member 25. Note that in FIG. 2 and FIG. 4, the upper half of the spool shaft 5 shows the position in the axial direction during the maximum drag operation, and the lower half shows the position when the amount of drag is reduced.

As shown in FIG. 3, a boss portion 2a formed in the central portion of the drag operation member 2 is rotatively supported on the second side cover 13b, and a lever portion 2b that extends outward in the radial direction from the boss portion 2a is configured so as to engage at a plurality of locations in the circumferential direction on the second side cover 13b. In addition, as shown in FIG. 4, an attachment member 2c that serves to mount the first cam member 21 is relatively unrotatably coupled to the inner peripheral portion of the boss portion 2a.

Figure 4:
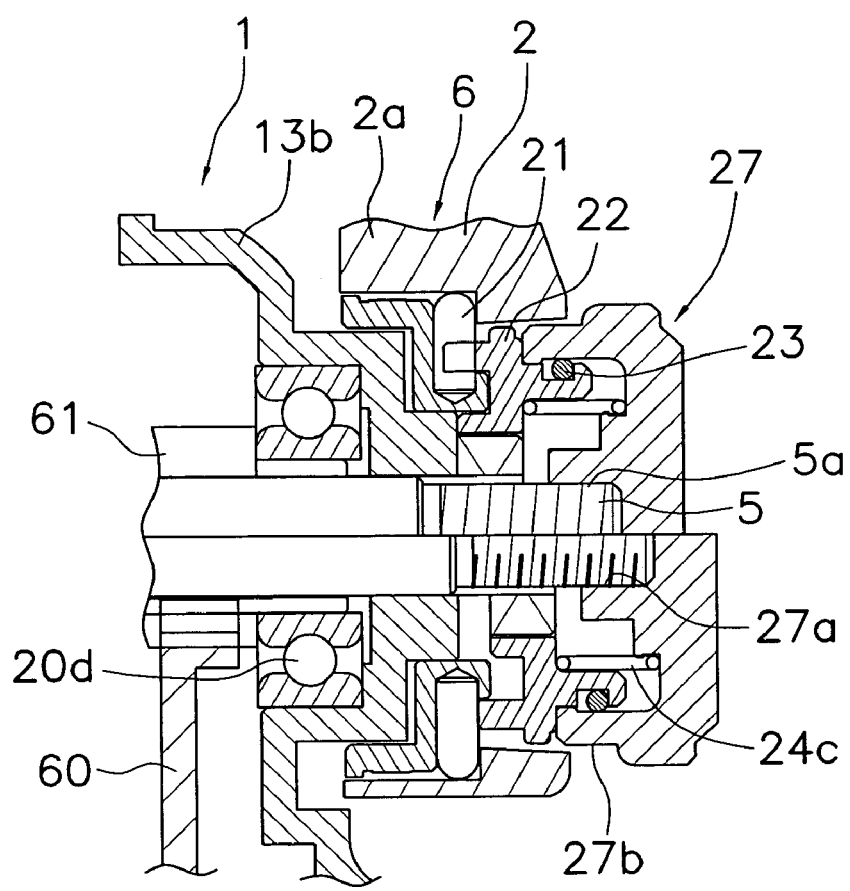
FIG. 4 is an enlarged cross-sectional view of the area around the drag mechanism according to the first embodiment of the present invention.

As shown in FIG. 4, the first cam members 21 are bar shaped cam pins that are fixedly disposed to a plurality of locations on the attachment member 2c of the drag operation member 2. The second cam member 22 is disposed to contact with the first cam member 21, and is a tubular member that is movable in the axial direction in response to the pivoting of the first cam member 21 and is unrotatable with respect to the spool shaft 5. The second cam member 22 is a slant cam that has slanted surfaces which come into contact with the first cam member 21. The inner peripheral portion of the second cam member 22 is non-rotatably mounted to the spool shaft 5. The second cam member 22 is immovably retained in the axial direction relative to the drag adjustment member 27 by the retaining member 23.

The second cam member 22 will move axially in the leftward direction as seen on the upper side of FIG. 4 by pivoting the drag operation member 2 in the counter-clockwise direction. Accordingly, the drag force is weakened. In addition, when the drag operation member 2 is pivoted in the clockwise direction, the second cam member 22 will move axially in the rightward direction as shown on the lower side of FIG. 4, and thereby increase the drag force.

As shown in FIG. 4, the retaining member 23 is a C-shaped retaining ring made from, for example, a resilient synthetic resin. The retaining member 23 is disposed so as to contact with the outer peripheral surface of the second cam member 22 and the inner peripheral surface of the drag adjustment member 27, such that the second cam member 22 and the drag adjustment member 27 are linked so as to be immovable in the axial direction due to urging the force of the C-shaped retaining ring that attempts to expand outward.

As shown in FIG. 4, the drag adjustment member 27 is a closed-end tubular shaped cap member that is relatively rotatably mounted on the second cam member 22, and is screwed onto the end of the spool shaft 5 that projects outward from the second side cover 13b. When the drag adjustment member 27 is rotated in the direction in which it is screwed onto the spool shaft 5, the drag adjustment member 27 pulls the spool shaft 5 axially outward (the right side of FIG. 4). A female threaded portion 27a is formed on the inner peripheral portion of the drag adjustment member 27, and screws onto a male threaded portion 5a formed on the end of the spool shaft 5. The third urging member 24c is composed of a coil spring, is mounted between the inner peripheral portion of the drag adjustment member 27 and the axial end surface of the inner peripheral portion of the second cam member 22, and continuously urges the drag adjustment member 27 outward. A step portion 27b that is lowered from the surrounding portion is formed in a groove shape along the circumferential direction in the outer peripheral portion of the tip of the drag adjustment member 27. By grasping and pulling the step portion 27b outward in the axial direction (the right side in FIG. 4) when the drag adjustment member 27 is to be attached or removed, the drag adjustment member 27 can be easily attached and removed.

The drag adjustment member 27 will move only slightly axially leftward as shown on the upper side of FIG. 4 by rotation in the counter-clockwise direction, and thereby slightly weaken the drag force. In addition, the drag adjustment member 27 will move only slightly axially rightward as shown on the lower side of FIG. 4 when rotated in the clockwise direction, and thereby slightly increase the drag force.

As shown in FIG. 2, the spool shaft 5 is a shaft member that is supported on the reel unit 1 to be movable in the axial direction and non-rotatable relative thereto. Bearings 20a, 20b that serve to rotatably mount the spool 4, and a bearing 20c that serves to rotatably support the second brake member 26 (described below), are mounted on the outer periphery of the spool shaft 5. As shown in FIG. 2 and FIG. 3, the second urging member 24b, which is a coil spring that urges the spool 4 inward in the axial direction (the left side of FIG. 2), is mounted on the outer periphery of the spool shaft 5 between the bearings 20a, 20b. In addition, as shown in FIG. 2, the first urging member 24a, which is a plate spring that urges the spool 4 inward in the axial direction (the left side of FIG. 2) is mounted on the outer periphery of the spool shaft 5 axially on the left hand side of the bearing 20a as shown in FIG. 2. The first urging member 24a has an urging force that is stronger than that of the second urging member 24b. Because of this, when the spool shaft 5 moves in the axial direction, the first urging member 24a will operate first, and then the second urging member 24b will operate.

In addition, a bearing 20d is mounted on the inner peripheral portion of the second side cover 13b, and supports the outer peripheral portion of a pinion gear 61 mounted on the outer periphery of the spool shaft 5. As shown in FIG. 2, the pinion gear 61 meshes with a main gear 60 that is fixedly coupled to the other end of the handle shaft 31. The tip of the pinion gear 61 is fixedly coupled to the inner peripheral side of the second brake member 26 (described below). As a result, the rotation from the handle 3 will be transmitted to the first brake member 25 via the main gear 60, the pinion gear 61, and the second brake member 26 and from the first brake member 25 to the spool 4, and the spool 4 will rotate.

As shown in FIG. 2 and FIG. 3, the first brake member 25 is an annular member disposed in the interior of the second side cover 11b, which is fixedly attached to the axially outer side of the spool 4 (the right side of FIG. 2). The first brake member 25 is formed to have a larger diameter than the small diameter portion 4d of the second flange portion 4c, which is the diameter of spool 4 up to which line can be wound.

The second brake member 26 is disposed to be contactable with the first brake member 25, and is mounted on the spool shaft 5 so as to be non-movable in the axial direction and non-rotatable in the line winding direction of spool 4. The second brake member 26 has a diameter that is slightly smaller than that of the first brake member 25, and is rotatably supported on the spool shaft 5 by the bearing 20c. The second brake member 26 meshes on the inner peripheral surface with the pinion gear 61. In addition, the movement of the second brake member 26 is restricted in the axially outward direction (the right side of FIG. 2) by the reel unit 1 via the pinion gear 61 and the bearing 20d.

Figure 5:
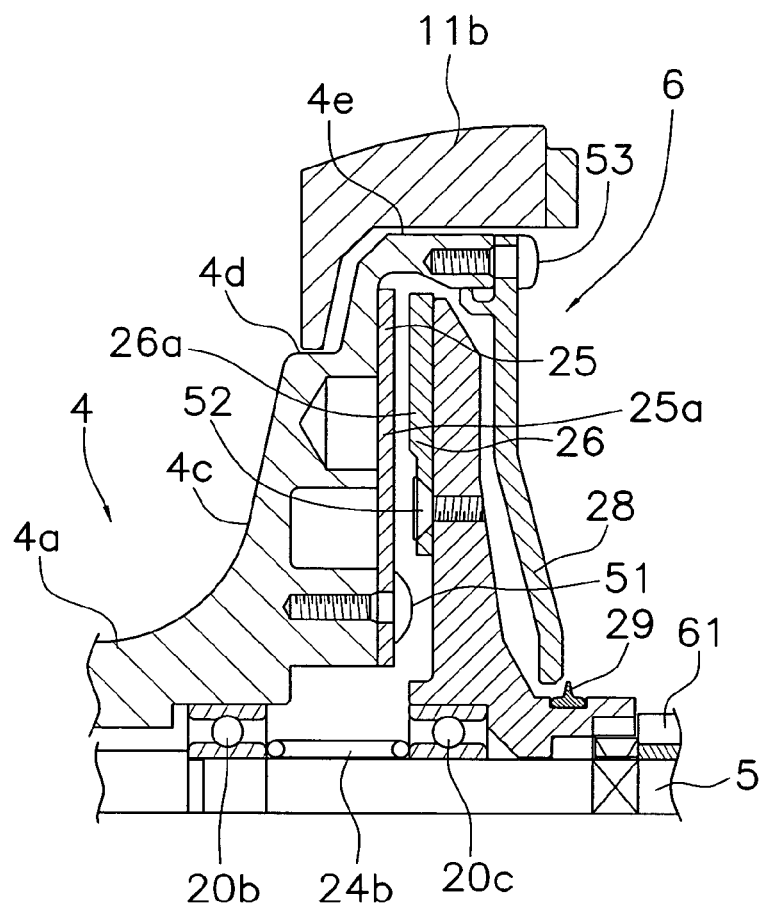
FIG. 5 is an enlarged cross-sectional view of the area around the first brake member according to the first embodiment of the present invention.

As shown in an enlarged view in FIG. 5, the first brake member 25 and the second brake member 26 respectively have a donut-shaped first sliding disk 25a and a second sliding disk 26a that have approximately the same diameter and are mounted on opposing surfaces so that they may be pressed into contact with each other. The first sliding disk 25a and the second sliding disk 26a are respectively fixedly attached to the first brake member 25 and the second brake member 26 with a plurality of screw members 51, 52. The first sliding disk 25a is, for example, made of a heat resistant synthetic resin such as a fiber reinforced resin in which a heat resistant resin such as a phenol resin or the like is impregnated in a carbon fiber fabric. The second sliding disk 26a is, for example, made of a heat and corrosion resistant metal such as stainless steel.

In addition, a cover disk 28 that covers the first brake member 25 and the second brake member 26 is non-rotatably coupled to the axially outward (right side of FIG. 2) edge of the large diameter portion 4e of the second flange portion 4c. The cover disk 28 is a disk-shaped member that extends in the spool shaft 5 direction so as to entirely cover the axially outward side of the second brake member 26 (the right side of FIG. 2). The cover disk 28 is coupled with screw members 53 to the tip of the large diameter portion 4e of the second flange portion 4c. In addition, an O-ring 29 is sealed in the outer peripheral portion of the second brake member 26, between the cover disk 28 and the second brake member 26.

In a dual bearing reel configured as above, when the terminal tackle is to be lowered, the drag operation member 2 will be operated to separate the spool 4 from the drag mechanism 6. As a result, the spool 4 will be freely rotatable, and the fishing line will be reeled out due to the weight of the terminal tackle alone.

After the terminal tackle has arrived at a desired water depth, the drag operation member 2 will be operated to engage the spool 4 and the drag mechanism 6. When the spool 4 and the drag mechanism 6 are engaged, the rotation from the handle 3 will be transmitted to the spool 4 via the main gear 60, the pinion gear 61, and the drag mechanism 6, and the spool 4 can be rotated by the handle 3. When a fish strikes the terminal tackle in this state, the spool 4 will rotate in the line release direction due to the pull of the fish.

At this point, the fishing line will be wound out at a predetermined drag force set by operation of the drag operation member 2. Here, when the drag operation member 2 is pivoted in the clockwise direction of FIG. 2, the first cam member 21 will move the second cam member 22 axially outward (the right side of FIG. 2), and thus the spool shaft 5 will move axially outward (the right side of FIG. 2). When the spool shaft 5 moves axially outward (the right side of FIG. 2), the spool 4 will also move axially outward (the right side of FIG. 2), the first brake member 25 that is attached to the outside of the spool 4 will move in the direction of the second brake member 26, and the first brake member 25 and the second brake member 26 will strongly press into contact with each other and increase the drag force. On the other hand, when the drag operation member 2 is pivoted in the counter-clockwise direction of FIG. 2, the spool shaft 5 will return axially inward (the left side of FIG. 2) due to the urging force of the first urging member 24a and the second urging member 24b. Accordingly, the first brake member 25 will separate from the second brake member 26, and the pressing force of the first brake member 25 and the second brake member 26 will weaken. Thus, the drag force is weakened.

In addition, when one wants to minutely adjust the drag force of the drag mechanism 6, the drag adjustment member 27 is rotated. When the drag adjustment member 27 is rotated in the clockwise direction, the spool shaft 5 will move axially outward (the right side of FIG. 2) only slightly, the pressing force between the first brake member 25 and the second brake member 26 will increase only slightly, and thus the drag force will slightly increase. On the other hand, when the drag adjustment member 27 is rotated in the counter-clockwise direction, the spool shaft 5 will move axially inward (the left side of FIG. 2) only slightly, the pressing force between the first brake member 25 and the second brake member 26 will decrease only slightly, and thus the drag force will slightly weaken.

With this type of drag mechanism 6, in order to change the brake characteristics with respect to the operating position of the drag operation member 2, the second cam member 22 may have to be replaced with another second cam member having a different slant angle. Here, in replacing the second cam member 22, the drag adjustment member 27 can be removed together with the second cam member 22 by removing from the spool shaft 5 the drag adjustment member 27 that is attached integrally with the second cam member 22 with the retaining member 23.

With the spool 4 of the dual bearing reel having the drag mechanism 6 as noted above, the second flange portion 4c is formed so as to have a diameter that is larger than that of the first flange portion 4b. In addition, the small diameter portion 4d is formed so that the bobbin side 4a has a diameter that is smaller than that of the first brake member 25, the large diameter portion 4e has a diameter that is larger than that of the first brake member 25, and the large diameter portion 4e has a diameter that is larger than that of the small diameter portion 4d. Accordingly, the first brake member 25 can form a large diameter, and the braking force of the drag can be increased.

In addition, the second flange portion 4c is formed so that the bobbin 4a side has a diameter that is smaller than that of the first brake member 25, and the small diameter portion 4d has a diameter that is smaller than that of the large diameter portion 4e. Therefore, the step portion of the small diameter portion 4d will serve as an upper limit guide up to which the fishing line will be wound. Thus, the amount of fishing line to be wound does not reach beyond the upper limit, and the torque applied to the spool during wind-up can be reduced. Therefore, the rotation of the spool 4 during wind-up can be smoothly maintained, and the braking capacity of the drag mechanism 6 can be improved.

OTHER EMBODIMENTS

Figure 6:
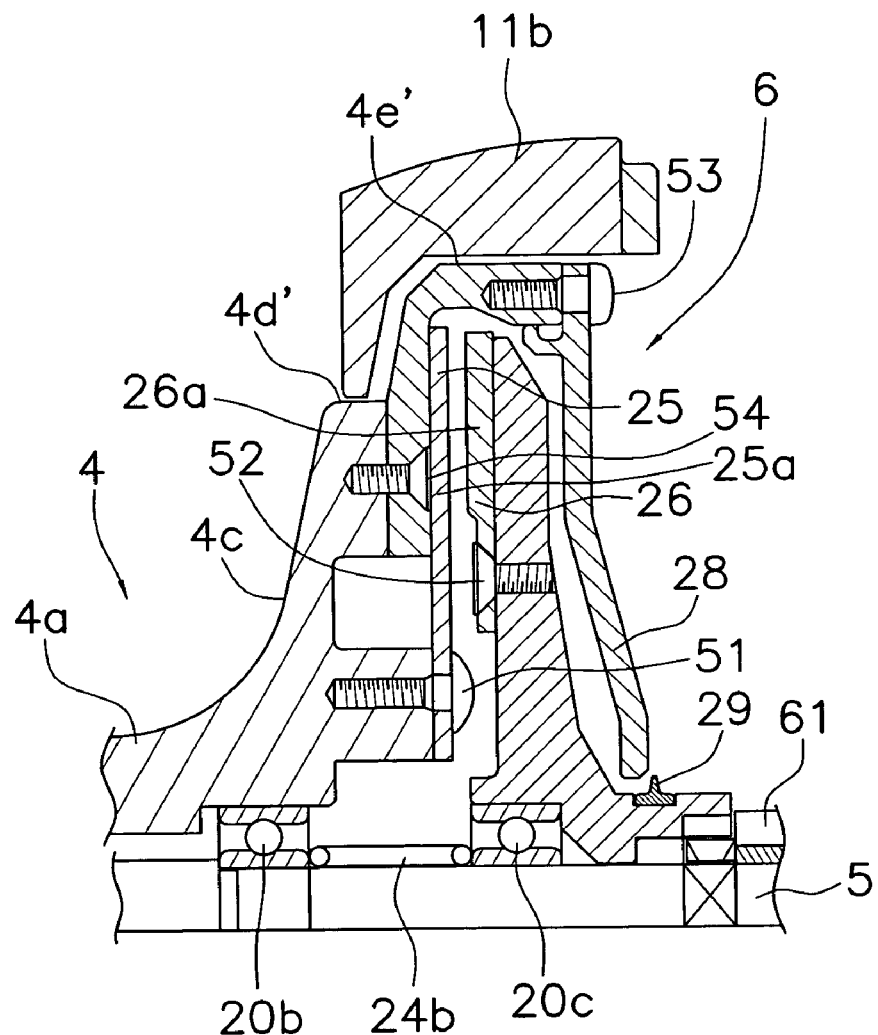
FIG. 6 is an enlarged cross-sectional view of the area around the first brake member according to the other embodiment (c) of the present invention.
Figure 7:
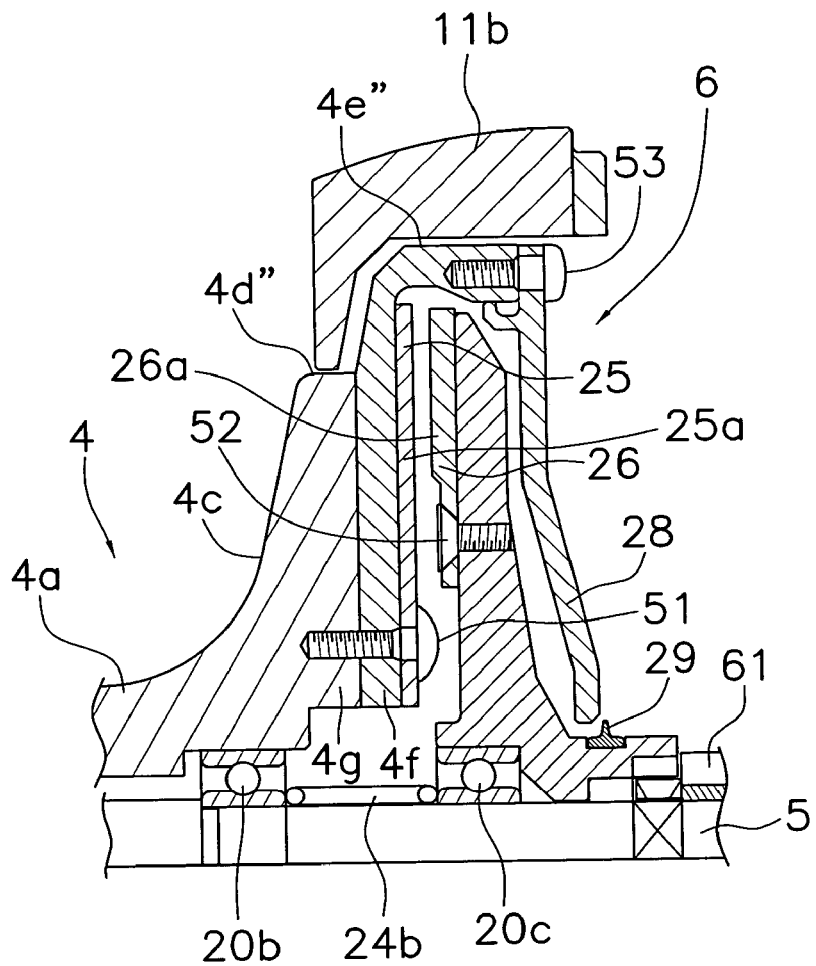
FIG. 7 is an enlarged cross-sectional view of the area around the first brake member according to the other embodiment (c) of the present invention.
Figure 8:
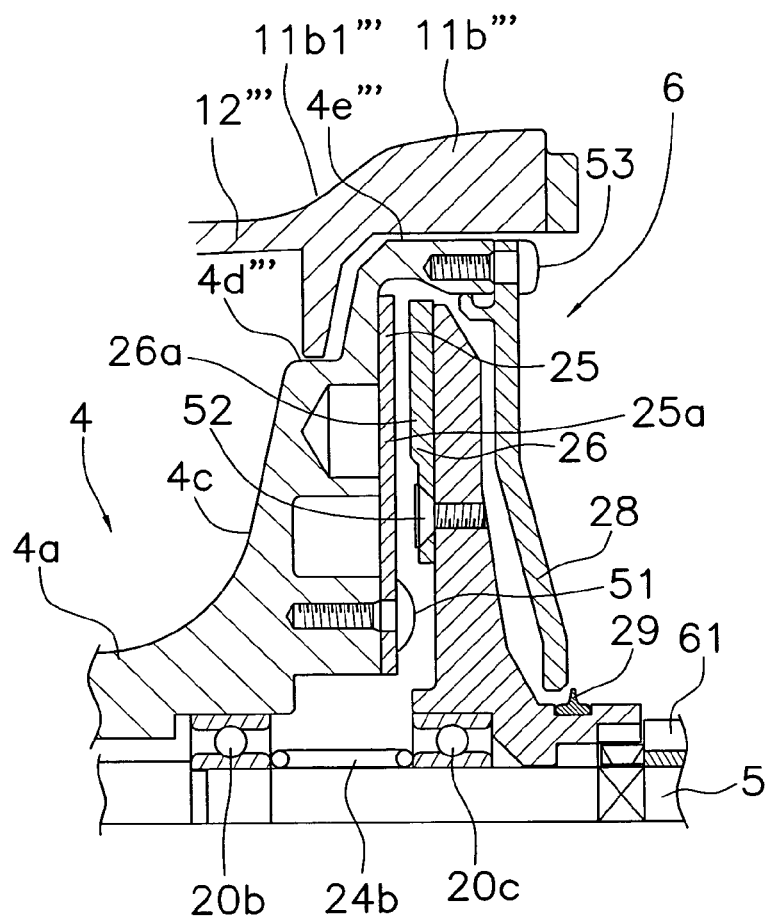
FIG. 8 is an enlarged cross-sectional view of the area around the first brake member according to the other embodiment (d) of the present invention.

Referring now to FIGS. 6–8, dual bearing reels in accordance with alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the alternate embodiments that differ from the parts of the first embodiment will be indicated with a prime ('), a double prime ("), and a triple prime ("').

(a) In the aforementioned embodiment, a mid-sized dual bearing reel is employed. However, the size and shape of the reel is not limited to this. For example, a large dual bearing reel may be constructed such that the connectors 12 are provided on the upper portion of the reel unit 1.

(b) In the aforementioned embodiment, only the drag operation member 2 and the drag adjustment member 27 are provided in the drag mechanism 6 as operation members that can be operated from the exterior. However, for example, other operation members for locking and unlocking the drag mechanism 6 may be additionally provided.

(c) In the aforementioned embodiment, the small diameter portion 4d and the large diameter portion 4e are unitarily formed. However, as shown in FIG. 6, the small diameter portion 4d' and the large diameter portion 4e' may be formed separately, and the large diameter portion 4e' may be coupled with a plurality of screw members 54 to the axially outer side (the right side of FIG. 6) of the small diameter portion 4d. In addition, as shown in FIG. 7, a configuration is possible which includes a third flange portion 4f that is formed unitarily with the large diameter portion 4e and extends on the inner priphery of the large diameter portion 4e, and a fourth flange portion 4g that is disposed on the inner peripheral side of the small diameter portion 4d adjacent to the third flange portion 4f and is formed unitarily with the small diameter portion 4d and the bobbin 4a. The third flange portion 4f is screwed on the fourth flange portion 4g together with the first brake member 25 with a plurality of screw members 51.

(d) As shown in FIG. 8, with a configuration in which the connectors 12''' is provided inside the outer shape of the reel on the upper portion of the reel unit 1''', the portion of the second side plate 11b''' that covers the gap between the large diameter portion 4e''' and the small diameter portion 4d''' may have a slanted surface 11b1''' that is slanted in the axial direction with the axially inner side having a smaller diameter than that of the axially outer side. Accordingly, the second side plate 11b''' is smoothly linked with the outer shape of the connectors 12 via the slanted surface 11b'''. Here, the entire reel can be made smaller.

(e) The ratio between the outer diameters of the first side plate 11a and the second side plate 11b, the first side cover 13a and the second side cover 13b, and the spool 4 and the drag mechanism 6 are not limited to the ratios discussed the aforementioned embodiment.

According to the present invention, with lever drag type dual bearing reels, since the bobbin side of the second flange portion has a diameter smaller than that of the first brake member, and the outermost peripheral side of the second flange has a diameter larger than that of the first brake member. Thus, the braking capacity of the drag mechanism can be improved, while the rotation of the spool during the wind-up operation can be smoothly maintained.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-141379. The entire disclosure of Japanese Patent Application No. 2004-141379 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A dual bearing reel that is adapted to release and wind fishing line, comprising:
   a handle;
   a reel unit on which the handle is mounted;
   a spool that is rotatably disposed within the reel unit and has a tubular bobbin portion around the outer periphery of which fishing line is adapted to be wound, and first and second flange portions that are arranged on both ends of the bobbin portion to project radially outward; and a drag mechanism having a drag operation member that is pivotally mounted on the reel unit, a first brake member that is attached to the second flange portion, and a second brake member that is arranged axially movably and opposite the first brake member;

the second flange portion having a large diameter portion and a small diameter portion, the large diameter portion having a diameter that is larger than that of the first brake member, the small diameter portion defining a step portion between the bobbin portion and the large diameter portion and having a diameter that is smaller than that of the first brake member.

2. The dual bearing reel according to claim 1, wherein the diameter of the small diameter portion is substantially the same as that of the first flange portion.

3. The dual bearing reel according to claim 1, wherein the large diameter portion is unitarily formed with the small diameter portion.

4. The dual bearing reel according to claim 1, wherein the bobbin portion and the first and second flange portions are formed as one-piece unitary member.

5. The dual bearing reel according to claim 1, wherein the first brake member is attached to the second flange portion with a screw.

6. The dual bearing reel according to claim 1, wherein the diameter of the large diameter portion is equal to and greater than 110% and equal to and less than 140% of the diameter of the small diameter portion.

7. The dual bearing reel according to claim 6, wherein the diameter of the large diameter portion is equal to and greater than 120% and equal to and less than 130% of the diameter of the small diameter portion.

8. A dual bearing reel that is adapted to release and wind fishing line, comprising:
a handle
a reel unit on which the handle is mounted;
a spool that is rotatably disposed within the reel unit and has a tubular bobbin portion around the outer periphery of which fishing line is adapted to be wound, and first and second flange portions that are arranged on both ends of the bobbin portion to project radially outward; and a drag mechanism having a drag operation member that is pivotally mounted on the reel unit, a first brake member that is attached to the second flange portion, and a second brake member that is arranged axially movably and opposite the first brake member;

the second flange portion having a large diameter portion and a small diameter portion, the large diameter portion having a diameter that is larger than that of the first brake member, the small diameter portion being formed between the bobbin portion and the large diameter portion and having a diameter that is smaller than that of the first brake member, the large diameter portion being formed separately from the small diameter portion.

9. The dual bearing reel according to claim 8, wherein the second flange portion further includes a third flange portion that is unitarily formed with the large diameter portion and extends toward the inner periphery of the large diameter portion, and a fourth flange portion that is formed on the inner peripheral side of the small diameter portion, the fourth flange portion being formed unitarily with the small diameter portion opposite the third flange portion, and the third flange portion together with the first brake member is attached to the fourth flange portion with a screw.

10. A dual bearing reel that is adapted to release and wind fishing line, comprising:
a handle;
a reel unit on which the handle is mounted;
a spool that is rotatably disposed within the reel unit and has a tubular bobbin portion around the outer periphery of which fishing line is adapted to be wound, and first and second flange portions that are arranged on both ends of the bobbin portion to project radially outward; and a drag mechanism having a drag operation member that is pivotally mounted on the reel unit, a first brake member that is attached to the second flange portion, and a second brake member that is arranged axially movably and opposite the first brake member;

the second flange portion having a large diameter portion and a small diameter portion, the large diameter portion having a diameter that is larger than that of the first brake member, the small diameter portion being formed between the bobbin portion and the large diameter portion and having a diameter that is smaller than that of the first brake member, the reel unit having a first side plate and a second side plate that are disposed opposite one another across a predetermined gap, connectors that connect the first side plate and the second side plate, a first side cover that covers the exterior of the first side plate, and a second side cover on which the handle is mounted and which covers the exterior of the second side plate, the spool being disposed between the first and second side plates, and the second side plate being disposed so as to cover a stepped surface formed between the large diameter portion and the small diameter portion.

11. The dual bearing reel according to claim 10, wherein the second side plate extends radially inward in the radial direction so as to be adjacent to the small diameter portion.

12. The dual bearing reel according to claim 10, wherein a portion of the second side plate that covers the stepped surface between the large diameter portion and the small diameter portion is slanted, the small diameter portion side being smaller in diameter than the large diameter side, and the reel unit further includes a connector that connects the first and second side plates, the connector being smoothly connected with the second side plate.

* * * * *